United States Patent [19]

Glover

[11] Patent Number: 5,412,429
[45] Date of Patent: May 2, 1995

[54] PICTURE DATA COMPRESSION CODER USING SUBBAND/TRANSFORM CODING WITH A LEMPEL-ZIV-BASED CODER

[75] Inventor: Daniel R. Glover, Bay Village, Ohio

[73] Assignee: The United States of America as represented by the Administrator of the National Aeronautics and Space Administration, Washington, D.C.

[21] Appl. No.: 29,520

[22] Filed: Mar. 11, 1993

[51] Int. Cl.⁶ .............................................. H04N 7/12
[52] U.S. Cl. ................................... 348/398; 348/397; 348/388; 348/384
[58] Field of Search ................ 348/398, 384, 388, 397, 348/414, 417–419, 422; H04N 7/12

[56] References Cited

U.S. PATENT DOCUMENTS

| | | | |
|---|---|---|---|
| 4,463,377 | 7/1984 | Meyer et al. | 358/133 |
| 4,891,840 | 1/1990 | Reudink | 381/29 |
| 4,918,524 | 4/1990 | Ansari et al. | 358/133 |
| 4,941,193 | 7/1990 | Barnsley et al. | 382/56 |
| 4,969,040 | 11/1990 | Gharavi | 348/398 |
| 5,058,137 | 10/1991 | Shah | 375/94 |
| 5,216,719 | 6/1993 | Oh | 348/398 |
| 5,235,420 | 8/1993 | Gharavi | 348/398 |
| 5,285,470 | 2/1994 | Schreiber | 375/1 |
| 5,309,232 | 5/1994 | Hartung et al. | 348/398 |

OTHER PUBLICATIONS

"Subband Coding of Images", John W. Woods et al., IEEE 1986, pp. 1278–1287.
"Subband Coding of Motion Pictures at 2 Mbit/s", Brandt, pp. 190–197.
Subband Coding for Image Data Archiving D. Glover & s. C. Kwatsa; NASA Technical Memorandum 105407 Mar. 24–27, 1992.

*Primary Examiner*—Tommy P. Chin
*Assistant Examiner*—Vu Le
*Attorney, Agent, or Firm*—Gene E. Shook; James A. Mackin; Guy M. Miller

[57] ABSTRACT

Digital data coders/decoders are used extensively in video transmission. A digitally encoded video signal is separated into subbands. Separating the video into subbands allows transmission at low data rates. Once the data is separated into these subbands it can be coded and then decoded by statistical coders such as the Lempel-Ziv based coder.

28 Claims, 2 Drawing Sheets

PICTURE DATA COMPRESSION CODER USING SUBBAND/TRANSFORM CODING WITH A LEMPEL-ZIV-BASED CODER

ORIGIN OF THE INVENTION

The invention described herein was made by an employee of the U.S. States Government and may be manufactured and used by or for the Government for governmental purposes without the payment of any royalties thereon or therefor.

FIELD OF THE INVENTION

This invention relates to the transmission of video signals and is directed more particularly to a method and apparatus for subbanding and compressing video data for transmission.

1. Background Of The Invention

Subband coders for the compression of video signals have been used since about 1984. The typical subband coder generally consists of a transform stage followed by a quantization stage and a statistical coding stage. The statistical coding usually consists of a run-length coder followed by a Huffman coder. These coders are well known in the prior art.

Lempel-Ziv-based coders became available in 1977. These coders are typically used for text compression, for example, a document created on a word processor. The prior art has taught away from using a Lempel-Ziv-based coder for video picture data because of the few occurrences of exact repetition of strings of pixels which make up a video image.

2. Description Of The Related Art

Meyer-Ebrecht et al U.S. Pat. No. 4,463,377 discloses a system for coding and decoding picture element signals. A transform arrangement and a corresponding retransformation arrangement are formed by a plurality of auxiliary transformers/retransformers.

Ansari U.S. Pat. No. 4,918,524 discloses a subband coding technique wherein polyphase filter banks split a high sample rate signal into two sample streams at half the rate.

Reudink U.S. Pat. No. 4,891,840 discloses a method of subband signal transmission in which a wide band signal is separated into two or more narrower band channels which are subsequently modulated down to baseband.

SUMMARY OF THE INVENTION

The present invention is directed to a subband/transform coding system. The method and apparatus of the invention disclosed produces a digitally encoded signal which is a transformed version of an analog signal such as a video signal for example. The digitally encoded signal maintains the integrity of the original signal but allows transmission at low data rates. The transformed data is organized into frequency subbands with the lowest frequency subband being a low resolution version of the original signal. Once the data has been transformed into subbands, it can be coded with statistical coders. The statistical coder used in this invention is a Lempel-Ziv-based coder.

In accordance with the invention, the original data is first converted to frequency subbands. Once this is done there are two possibilities: 1) lossless coding in which a statistical coder is applied directly to the transformed data, or 2) Lossy coding in which some of the transformed data is discarded to improve the compression.

In the first case of lossless coding, the Lempel-Ziv-based coder is applied directly to the transformed data. In the second case of lossy coding, the transformed data is quantized into bins before the statistical coding is applied. Two stages of coding are applied to the quantized data. First, run-length coding is used to compress runs of identical values, then the Lempel-Ziv-based coder is applied to the run-length coded data.

At the receiving end, the data is decoded in the reverse order of the encoding process. For lossy coding this would entail Lempel-Ziv-based decoding, followed by run-length decoding, converting the data back into the original range from the quantization bins and an inverse transformation of the subbands into the original data domain.

Quantization is the key difference between lossy and lossless coding. After quantization, compression is obtained by using lossless coders, such as run-length and Huffman coders. Therefore, all of the loss in a data compression system using quantization comes from the quantization stage. Quantization maps a range of values onto one quantization value, which is normally referred to as a bin. This process reduces the variability of data by restricting the number of possible values to a small number.

In coarse quantization some information is removed with the noise on an image. Although compression improves with coarser quantization, this technique also adds distortion to the reconstructed image. If a histogram is taken of these subbands the histogram will have a peak around a value of zero, due to the small differences in valve between most adjacent pixels. As a result, the values around zero (also known as the deadband), will quantize more values to zero providing longer run-lengths at a cost of more distortion. Therefore, the key values when using coarse quantization of subbands are the values around zero.

The type of subband that should be used can be deduced by looking at the histogram of subbands. These histograms have peaks around zero for all but the lowest band. To prepare the data coming out of the quantizer to go into a run-length coder a large amount of zero values are required. As a result of the large number of subband values around zero and the symmetry of the histograms associated with the subbands; a symmetric midtread quantizer is used in the present invention. The midtread symmetric quantizer is used because it has a quantization bin with zero at the center and can be centered around zero.

If uniform quantization is used with large bin sizes (ie 32), then a deadband smaller than the uniform bin size may be necessary to minimize the difference between a reconstructed pixel value and an original pixel value.

The present invention uses four quantizer designs 1) a fine quantizer for Differential Pulse Code Modulation(DPCM) coding of the low band, 2) a fine quantizer for subbands of high-quality reconstructions for scientific applications, 3) a coarse quantizer for mid-bands of an entertainment-quality reconstruction, and 4) a very coarse quantizer for the highest band of the entertainment quality reconstruction.

It is an object of the invention to provide an apparatus and method for compressing video image data into bands and subbands and grouping the data whereby a dictionary based compression scheme may be utilized.

Another object of the invention is to provide a method and apparatus for coding and decoding digitized video signals by transforming the signals into bands and subbands, quantizing the data of the subbands and statistically coding the data. Decoding is accomplished by reversing the process.

BRIEF DESCRIPTION OF THE DRAWINGS

The advantages and novel features of the invention will be more fully apparent from the description when read in conjunction with the accompanying drawings in which.

DESCRIPTION OF THE PREFERRED EMBODIMENT

Figure 1:
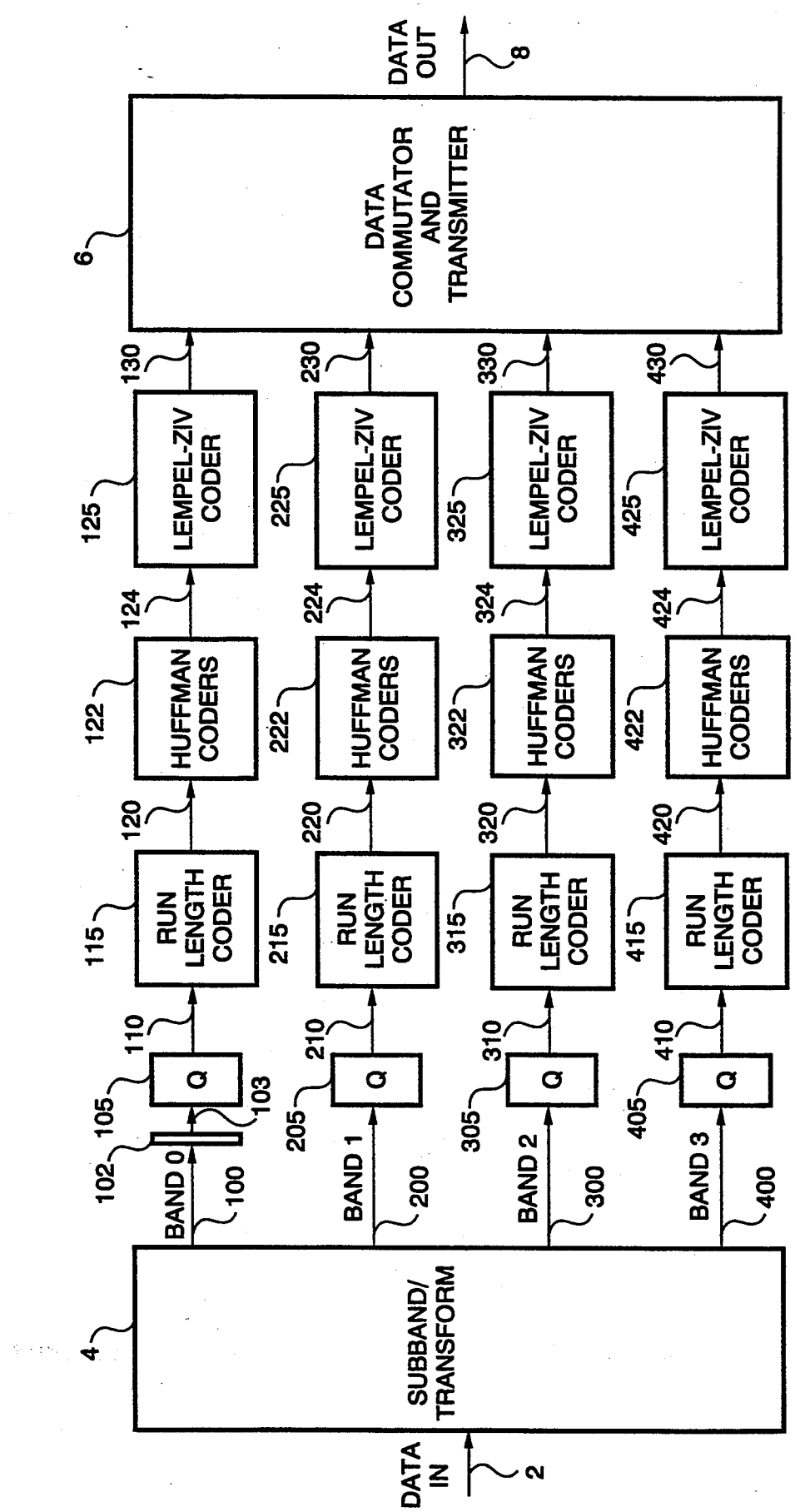
Fig. 1 displays a block diagram of a lossy coder.

The present invention is directed to an apparatus for coding and decoding a video signal using a Lempel-Ziv-based coder. The preferred embodiment utilizes a mid-tread, non-uniform, symmetric quantizer. In defining the bins and the quantization values of each bin, the design was divided into three sections, 1) deadband, 2) low bins (near zero), and 3) high bins (away from zero). The quantizer is applied to subbanded image data that has not been scaled or rounded to eight bit values, for example, 10 bit values for a four-band Walsh-Hadamard transform where the original image consisted of eight bit pixels. If the subband values are rounded to eight bits before quantizing, additional distortions would be introduced because; rounding to eight bits is a uniform quantization and a two-stage quantization will introduce additional distortion unless the bin boundaries for the second stage exactly match a subset of the bin boundaries for the first stage.

The deadband design requires that a bin size is selected since the quantization value will be zero. A large bin size will result in longer runs of zeros and increased distortion in the reconstructed image. A smaller bin size will result in fewer zero quantization values and better reconstruction. The design trade-off is to make the bin as large as possible without introducing noticeable distortion due to quantization.

From the histograms of the subbands it can be determined that smaller bin sizes are appropriate near zero, for example between $-32$ and $+32$. For the bins nearest the deadband, the quantization value for the low bins should be closer to zero than the center of the bin because of the curve of the histogram in the bin. The optimum design point is the centroid of the histogram in the bin, but that value will change from image to image. Looking at values beyond $+32$, large bins with centered quantization values are sufficient because the contribution to quantization noise by having a value at the center of the bin, rather than at the centroid, will be small. For the DPCM quantizer, the number of bins is 31 with a deadband from $-2$ to $+2$. The fine quantizer has 63 bins with a deadband from 3 to $+3$. The two coarse quantizers have a deadband of $-7$ to $+7$, with one with 7 bins and one with 15 bins. The quantizers generally have smaller bins near zero compared to bins away from zero since most subbanded values are expected to be near zero. The fine quantizer has a maximum bin size of nine with a quantization value at the center of the bin. Thus, no quantized value changes from its original value by more than four counts. The non-uniform quantizers used here are composed of uniform quantizers with larger bin sizes used for the more extreme values. The subbanded data was processed such that the range of raw values was $-255$ to $+255$. This was accomplished by combining the transform scaling factor for analysis and synthesis into one scaling factor for analysis of $\frac{1}{4}$.

The run length coder quantized subband values were designed to take advantage of the structure of the data from the quantizer. The data coming out of the quantizer consist of many runs of zeros with some very long runs where there is little spatial high frequency information. The number of different non-zero values equal the number of bins (less the deadband) in the quantizer, which is less than the number of possible values in the unquantized data. There are runs of non-zero values, but they are not as long as the zero value runs.

To take advantage of this structure, the run length coder has been designed to encode the subbands into one or two byte long codewords representing runs of zeros or of up to sixteen different quantized values. This run length coder maintains bytesized codewords which simplifies handling of the data. The first of the codewords determines whether it represents a run of zeros or a run of non-zero values. Runs of zeros are coded with one or two bytes, while runs of non-zeros are coded with one byte only. The second bit in a codeword that represents a run of zeros indicates whether the length of the codeword is one or two bytes long. The remaining bits are the length of the run of zeros up to 64 for a one byte codeword, and up to 16448 for a two byte codeword).

For example, if the codeword represents a run of non-zero values, then four bits of the codeword represents the bin identification and the remaining three bits represent the length of the run (up to eight). The non-zero codewords can handle up to sixteen quantization bins with a run length of one to eight. The codewords use the following format:

| | | one byte zero codeword | | | | | |
|---|---|---|---|---|---|---|---|
| b7 | b6 | b5 | b4 | b3 | b2 | b1 | b0 |
| 0 | 0 | R | R | R | R | R | R |
| | | two byte zero codewords | | | | | |
| b15 | b14 | b13 | b12 | b11 | b10 | b9 | b8 |
| 0 | 1 | R | R | R | R | R | R |
| b7 | b6 | b5 | b4 | b3 | b2 | b1 | b0 |
| R | R | R | R | R | R | R | R |
| | | non-zero, 16-bin codeword | | | | | |
| b7 | b6 | b5 | b4 | b3 | b2 | b1 | b0 |
| 1 | B | B | B | B | R | R | R | where:
B indicates bin identifying bits
R indicates run length bits

Since high band quantization has 63 bins, the run length coder was modified for use with high band data that has 64 bins. The change to increase the number of bins reduces the length of runs that can be coded to a maximum of two. The non-zero codewords for the 64 bin version follow the format below:

| | | non-zero, 64-bin codeword | | | | | |
|---|---|---|---|---|---|---|---|
| b7 | b6 | b5 | b4 | b3 | b2 | b1 | b0 |
| 1 | B | B | B | B | B | B | R |

The classical approach for lowband coding uses a Data Pulse Code Modulation coder for the low band and a quantizer/run-length coder for the upper bands.

The Data Pulse Code Modulation coder uses a third-order predictor using three previously decoded pixels, x =0.5A +0.25B +0.25C, where x is the prediction, A is the previous horizontal pixel, B is the previous verticle pixel, and C is the previous diagonal pixel following B. In the classical approach, the differential signal is quantized with a 31level, symmetric, non-uniform quantization, followed by a variable length coder.

The Data Pulse Code Modulation predictor is also used in the present invention with a different quantizer and entropy coder. In this scheme, the quantizer has a deadzone of ±2 and bin sizes of 5 low bins and 23bins above 13 with no upper threshold. After quantization, an adaptive Huffman coder or Lempel-Ziv based coder is used to perform compression.

In FIG. 1 a video input is fed into a subband transform means 4. The subband transform means separates the signal into a plurality of subbands identified by numerals 100, 200, 300 and 400. The lowband signal 100 is first fed into a Digital Pulse Code Modulator (DPCM) at 102, which then produces a DPCM subband at 103. The DPCM subband and the other subbands are then fed into a plurality of quantizers denoted by 105, 205, 305, and 405, respectively. The quantizers reduce the variability in the signal by removing some of the data thereby producing quantized signals with less variation at 110, 210, 310 and 410. This data is then fed into a plurality of run-length coders 115, 215, 315, and 415, which group the data into values thereby producing grouped signals at 120, 220, 320 and 420. At this point, there is enough similarity in the grouped signals to use a compression technique like the Lempel-Ziv technique. However, the grouped data can also be fed into a plurality of Huffman coders at 122, 222, 322 and 422 thereby producing Huffman compressed subbands at 124, 224, 324, and 424. Further compressing can then be done using a plurality of Lempel-ziv coders 125, 225, 325 and 425. This coding technique then produces compressed subbands at 130, 230, 330 and 430. These compressed subbands can then be used as inputs to a data commutator/transmitter 6 which combines the subbands and produces a coded signal output at 8.

Figure 2:
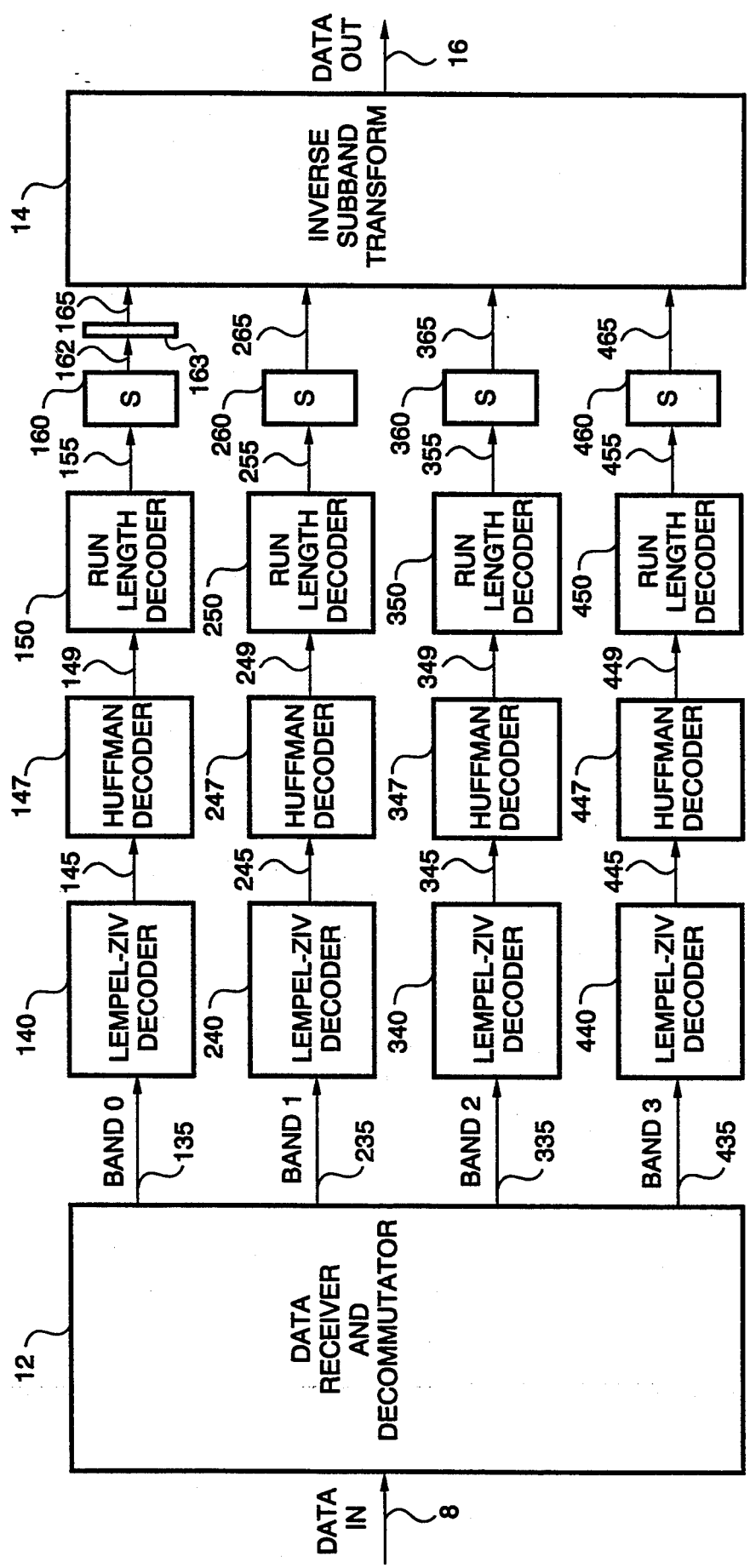
FIG. 2 displays a block diagram of a lossy decoder.

In FIG. 2 the coded signal 8 of FIG. 1 is fed in as input at 8 in FIG. 2. This signal is processed through a data receiver and decommutator 12 which produces subband signal outputs at 135, 235, 335, and 435. These subbanded outputs are then fed into a plurality of Lempel-Ziv decoders at 140, 240, 340, and 440, respectively where the data is decompressed. These decompressed subbands denoted by 145, 245, 345, an 445 is used as input for the Huffman coders denoted by 147, 247, 347 and 447. The Huffman coders produce Huffman decompressed subbands at 149, 249, 349 and 449; which are then fed into the run length decoders denoted by 150, 250, 350, and 450. The run length decoders ungroup the information thereby producing ungrouped subbands at 155, 255, 355, and 455. The range shifters at 160, 260, 360 and 460 then take this input and create subbands with physically meaningful values at 165, 265, 365, and 465. This occurs without exception except for the lowband DPCM subband at 162. This subband goes through a de-DCPM box located at 162. These signals are then combined through an inverse subband transform means to produce a decoded signal at 16.

The compression gained by each of these three compression techniques can be found in TABLE I. In tables, data compression is analyzed for both fine and course quantization using several pictures as test sample images. These images include Lenna, a Baboon, IO and Jupiter. For each of the pictures the data compression achieved is given when using a Lempel-Ziv coder, a run length coder in conjunction with a Lempel-Ziv coder and a run length coder, Lempel-Ziv coder and Huffman coder. TABLE I given below gives the quantizer bin ranges and the values associated with each bin for the four types of quantizers used in the present invention. It should be noted that only the positive values are shown and the quantizers are symmetric around zero.

TABLE I

| QUANTIZERS | | | | | | | |
|---|---|---|---|---|---|---|---|
| DPCM 31 bins | | FINE 63 bins | | COARSE 1 (MID BANDS) 15 bins | | COARSE 2 (HIGH BANDS) 7 bins | |
| BIN RANGE | VALUE | BIN RANGE | VALUE | BIN RANGE | VALUE | BIN RANGE | VALUE |
| −2−2 | 0 | −3−3 | 0 | −7−7 | 0 | −7−7 | 0 |
| 3−7 | 5 | 4−7 | 5 | 8−31 | 20 | 8−63 | 20 |
| 8−12 | 10 | 8−12 | 10 | 32−61 | 41 | 64−190 | 127 |
| 13−25 | 17 | 13−17 | 15 | 62−102 | 82 | 191−255 | 254 |
| 26−42 | 34 | 18−22 | 20 | 103−143 | 123 | | |
| 43−59 | 51 | 23−27 | 25 | 144−184 | 164 | | |
| 60−76 | 68 | 28−31 | 30 | 185−225 | 205 | | |
| 77−93 | 85 | 32−40 | 36 | 226−255 | 246 | | |
| 94−110 | 102 | 41−49 | 45 | | | | |
| 111−127 | 119 | 50−58 | 54 | | | | |
| 128−144 | 136 | 59−67 | 63 | | | | |
| 145−161 | 153 | 68−76 | 72 | | | | |
| 162−178 | 170 | 77−85 | 81 | | | | |
| 179−195 | 187 | 86−94 | 90 | | | | |
| 196−220 | 212 | 95−103 | 99 | | | | |
| 221−255 | 255 | 104−112 | 108 | | | | |
| | | 113−121 | 117 | | | | |
| | | 122−130 | 126 | | | | |
| | | 131−139 | 135 | | | | |
| | | 140−148 | 144 | | | | |
| | | 149−157 | 153 | | | | |
| | | 158−166 | 162 | | | | |
| | | 167−175 | 171 | | | | |
| | | 176−184 | 180 | | | | |
| | | 185−193 | 189 | | | | |
| | | 194−202 | 198 | | | | |
| | | 203−211 | 207 | | | | |

TABLE I-continued

| QUANTIZERS | | | | | | | |
|---|---|---|---|---|---|---|---|
| DPCM 31 bins | | FINE 63 bins | | COARSE 1 (MID BANDS) 15 bins | | COARSE 2 (HIGH BANDS) 7 bins | |
| BIN RANGE | VALUE | BIN RANGE | VALUE | BIN RANGE | VALUE | BIN RANGE | VALUE |
| | | 212–220 | 216 | | | | |
| | | 221–229 | 225 | | | | |
| | | 230–238 | 234 | | | | |
| | | 239–247 | 243 | | | | |
| | | 248–255 | 252 | | | | |

In TABLE II given below, Lempel-Ziv and adaptive Huffman coding are compared. Adaptive Huffman coding was used to avoid the overhead incurred in transmitting the Huffman tree for every image. The images discussed in the table are the standard images used in the data compression arena. They are Lenna which is a picture of a woman, Baboon which is a picture of a mandril, Jupiter which is a picture of the planet Jupiter and IO which is a picture of one of the stars outside of Jupiter called IO. Table II compares higher bands of the test images in a four band split. The image is scanned with both a low pass filter and a high pass filter in both the horizontal and verticle directions. The first position represents the horizontal direction and the second position represents the verticle direction. So for example, HH represents a high pass filter scanning in the horizontal direction and a high pass filter scanning in the verticle direction. The HL denotes a high pass filter scanning in the horizontal direction and a low pass filter scanning in the verticle direction. Lastly, LH designates a low pass filter scanning in the horizontal direction and a high pass filter scanning in the verticle direction. In both cases the same quantizers and run-length coders are used, the difference is in the final coding stage. The Lempel-Ziv based coder beats the Huffman coder in 19 out of 24 cases, sometimes by a factor of over 100. In the five cases where the Huffman coder out performed Lempel-Ziv, the improvement was only around 10%. This occurred in images with lots of high frequency content which does not fit well with the model used for Lempel-Ziv coding. The Lempel-Ziv based coder works very well as a statistical coder for image data that has been quantized and subbanded. Lempel-ziv based coding also generally provides some improvement in compression for data that has already been Huffman coded. A comparison is made of just the Lempel-Ziv, the Lempel-Ziv with the runlength coder and the Lempel-Ziv, runlenght, and Huffman. For example, using fine quantinzation, a Lenna image scanned with a high pass filter in the horizontal direction and a high pass filter in the verticle direction an original of 65,540 bits of information is compressed to 4,105 bits using the Lempel-Ziv coder, 3,386 bits using the Lempel-Ziv and the runlength coder and 3,542 bits using the Lempel-Ziv, runlength and the Huffman coder.

TABLE II

| Image Data Identification | Original | LZ | LZ + Runlen. | LZ + Huff. + RunLen. |
|---|---|---|---|---|
| LENNA | | | | |
| Fine Quantization | | | | |
| HH | 65,540 | 4,105 | 3,836 | 3,542 |
| HL | 65,540 | 12,073 | 11,153 | 10,468 |
| LH | 65,540 | 8,328 | 7,579 | 7,119 |
| Coarse Quantization | | | | |
| HH | 65,540 | 1,202 | 1,122 | 1,127 |
| HL | 65,540 | 4,624 | 4,474 | 4,877 |
| LH | 65,540 | 3,002 | 2,781 | 3,210 |
| BABOON | | | | |
| Fine Quantization | | | | |
| HH | 65,540 | 19,788 | 18,920 | 17,910 |
| HL | 65,540 | 24,381 | 23,505 | 21,929 |
| LH | 65,540 | 27,475 | 25,176 | 25,176 |
| Coarse Quantization | | | | |
| HH | 65,540 | 8,963 | 8,816 | 8,707 |
| HL | 65,540 | 10,544 | 10,438 | 10,208 |
| LH | 65,540 | 11,473 | 11,388 | 11,218 |
| IO | | | | |
| Fine Quantization | | | | |
| HH | 51,204 | 802 | 757 | 1,059 |
| HL | 51,204 | 5,926 | 5,382 | 5,459 |
| LH | 51,204 | 4,114 | 3,681 | 3,939 |
| Coarse Quantization | | | | |
| HH | 51,204 | 136 | 95 | 189 |
| HL | 51,204 | 2,105 | 1,986 | 2,382 |
| LH | 51,204 | 1,167 | 1,038 | 1,418 |
| JUPITER | | | | |
| Fine Quantization | | | | |
| HH | 100,804 | 5,661 | 5,318 | 5,585 |
| HL | 100,804 | 15,476 | 14,372 | 14,190 |
| LH | 100,804 | 17,788 | 16,406 | 16,846 |
| Coarse Quantization | | | | |
| HH | 100,804 | 868 | 794 | 1,146 |
| HL | 100,804 | 4,183 | 3,938 | 4,388 |
| LH | 100,804 | 5,723 | 5,293 | 5,697 |

In TABLE III given below, the results of four test images are displayed. The Lempel-Ziv based coder results are better than the adaptive Huffman for three of the four images. The image where the adaptive Huffman does better is the Baboon image where the result is about 10% better than for the Lempel-Ziv coder. Run-length coding could be used before the statistical coders, but the added complexity was not justified by the small improvement in compression.

The low band coding determines the overall compression achieved because it is the hardest band to compress. The low band has all of the signal energy of the original, and so is the biggest challenge to code. A high quality low band is required for good reconstruction.

The basic reconstruction quality possible with given low band coding schemes can be estimated by using the low band alone to make a reconstruction For a four band split, this can be done by doubling the horizontal and vertical lines of data to obtain a reconstructed image the same size as the original(zooming in). The zoomed low band was used to give the base reconstructed Peak to Signal Noise Ratio (PSNR) values given in Table II. The images are compared using PSNR and the compression ratio (CR}) for five quantization and coarse quantization.

TABLE III

| | FINE QUANTIZATION | COARSE QUANTIZATION |
|---|---|---|
| LENNA | | |
| PSNR | 37.98 | 33.78 |
| CR | 6.9:1 | 11.1:1 |
| BABOON | | |
| PSNR | 35.68 | 28.77 |
| CR | 2.7:1 | 4.3:1 |
| IO | | |
| PSNR | 40.33 | 36.34 |
| CR | 10.1:1 | 15.0:1 |
| JUPITER | | |
| PSNR | 36.27 | 32.73 |
| CR | 6.9:1 | 12.5:1 |

TABLE IV given below, displays the (PSNR) for an several images. The PSNR is an indicator of image quality therefore the higher the PSNR the greater the signal compared to the noise associated with it. The PSNR is calculated relative to the original low band data. In the chart the base PSNR is calculated relative to the full size original image using only the low band quantized data for the reconstruction.

| IMAGE Quantized Original | FILE SIZE (bytes Adaptive Huffman | LZ-Based | PSNR (db) | BASE PSNR (db) |
|---|---|---|---|---|
| Lenna | | | | |
| low band 65,540 | 27,723 | 15,290 | 43.60 | 31.20 |
| BABOON | | | | |
| low band 65,540 | 27,327 | 30,489 | 38.85 | 23.23 |
| IO | | | | |
| low band 51,204 | 11,850 | 10,527 | 44.09 | 35.09 |
| JUPITER | | | | |
| low band 100,804 | 44,510 | 22,377 | 38.96 | 31.91 |
| original | | | | |
| lenna 262,148 | 73,254 | 83,379 | 43.51 | 43.51 |

While several embodiments of the invention are disclosed and described it will be apparent that various modifications may be made without departing from the scope of the invention or the scope of the subjoined claims.

What is claimed:

1. A subband/transform coding system comprising;
a subband coder including,
a subband unit for receiving a digital picture data signal and separating said signal into a plurality of subbands,
a plurality of quantizers for mapping said subbands into a bin thereby producing a plurality of quantized subbands,
a plurality of run length coders for grouping said quantized subbands thereby producing a plurality of grouped subbands,
a plurality of Lempel-Ziv coders for compressing said plurality of grouped subbands thereby producing a plurality of compressed subbands,
a data commutator/transmitter for recombining and transmitting said compressed subbands thereby producing a coded signal, and,
a subband decoder including,
a data receiver/commutator unit for receiving said coded signal and processing said coded signal thereby producing a plurality of encoded subbands,
a plurality of Lempel-Ziv decoders for decompressing said plurality of encoded subbands thereby producing a plurality of decompressed subbands,
a plurality of run length decoders for receiving said plurality of decompressed subbands and processing said plurality of decompressed subbands thereby producing a plurality of ungrouped subbands,
a plurality of range shifters for receiving said plurality of ungrouped subbands and processing said plurality of ungrouped subbands thereby producing a plurality of subbands, and
an inverse subband transform unit for receiving said plurality of subbands and processing said plurality of subbands thereby reconstructing said digital picture data signal.

2. An apparatus as claimed in claim 1 wherein said subband unit separates said digital picture data signal into a plurality of low band signals, a plurality of midband signals and a plurality of high band signals.

3. An apparatus as claimed in claim 2 wherein said plurality of quantizers are composed of a plurality of differential pulse code modulation quantizers for processing said plurality of lowband signals and a plurality of fine quantizers for processing said plurality of midband signals and a plurality of fine quantizers for processing said plurality of highbands.

4. An apparatus as claimed in claim 2 wherein said plurality of quantizers includes a differential pulse code modulation quantizer for processing said low bands, a plurality of first coarse quantizers for processing said midband signals and a plurality of second coarse quantizers for processing said highband signals.

5. An apparatus as claimed in claim 3 wherein each of said plurality of differential pulse code modulation quantizers includes 31 bins and each of said plurality of fine quantizers includes 63 bins.

6. An apparatus as claimed in claim 5 wherein said data pulse code modulation quantizer has a deadband from about −2 to about +2, said fine quantizer has a deadband from about −3 to about +3.

7. An apparatus as claimed in claim 6 wherein said run length coder encodes said plurality of subbands into a one byte zero codewords.

8. An apparatus as claimed in claim 6 wherein said run length coder encodes said plurality of subbands into two byte zero codewords.

9. An apparatus as claimed in claim 6 wherein said run length coder encodes said plurality of subbands into a non-zero bin codeword.

10. An apparatus as claimed in claim 6 wherein said run length coder encodes said plurality of subbands into a non-zero, 64-bin codeword.

11. An apparatus as claimed in claim 7 wherein said one byte zero codeword has the following format:

| b7 | b6 | b5 | b4 | b3 | b2 | b1 | b0 |
|---|---|---|---|---|---|---|---|
| 0 | 0 | R | R | R | R | R | R |

12. An apparatus as claimed n claim 8 wherein said two byte zero codeword has the following format:

| b15 | b14 | b13 | b12 | b11 | b10 | b9 | b8 |
|---|---|---|---|---|---|---|---|
| 0 | 1 | R | R | R | R | R | R |
| b7 | b6 | b5 | b4 | b3 | b2 | b1 | b0 |

13. An apparatus as claimed in claim 9 wherein said non-zero 16-bin codeword has the following format:

| b7 | b6 | b5 | b4 | b3 | b2 | b1 | b0 |
|----|----|----|----|----|----|----|----|
| 1  | B  | B  | B  | B  | R  | R  | R. |

14. An apparatus as claimed in claim 10 wherein said non-zero 64-bin codeword has the following format:

| b7 | b6 | b5 | b4 | b3 | b2 | b1 | b0 |
|----|----|----|----|----|----|----|----|
| 1  | B  | B  | B  | B  | B  | B  | R. |

15. An apparatus as claimed in claim 6 wherein said encoder includes a plurality of huffman coders wherein said plurality of grouped subbands are fed into the huffman coders thereby producing a plurality of huffman compressed subbands and said huffman compressed subbands are fed into said plurality of lempel-ziv coders and wherein, said decoder includes a plurality of huffman coders wherein said plurality of decompressed signals are fed into the huffman coders thereby producing a plurality of huffman decompressed subbands and said Huffman decompressed subbands are fed into said plurality of run length decoders.

16. An apparatus as claimed in claim 4 wherein each of said data pulse code modulation quantizer includes 31 bins, each of said first coarse quantizer includes 15 bins and each of said second coarse quantizer includes 7 bins.

17. An apparatus as claimed in claim 16 wherein said data pulse code modulation quantizer has a deadband from about −2 to about +2, said first coarse quantizer has a deadband from about −7 to about 7 and said second coarse quantizer has a deadband from about −7 to about 7.

18. An apparatus as claimed in claim 17 wherein said run length coder encodes said plurality of subbands into a one byte zero codewords.

19. An apparatus as claimed in claim 17 wherein said run length coder encodes said plurality of subbands into two byte zero codewords.

20. An apparatus as claimed in claim 17 wherein said run length coder encodes said plurality of subbands into a non-zero bin codeword.

21. An apparatus as claimed in claim 17 wherein said run length coder encodes said plurality of subbands into a non-zero, 64-bin codeword.

22. An apparatus as claimed in claim 21 wherein said one byte zero codeword has the following format:

| b7 | b6 | b5 | b4 | b3 | b2 | b1 | b0 |
|----|----|----|----|----|----|----|----|
| 0  | 0  | R  | R  | R  | R  | R  | R. |

23. An apparatus as claimed in claim 22 wherein said two byte zero codeword has the following format:

| b15 | b14 | b13 | b12 | b11 | b10 | b9 | b8 |
|-----|-----|-----|-----|-----|-----|----|----|
| 0   | 1   | R   | R   | R   | R   | R  | R  |
| b7  | b6  | b5  | b4  | b3  | b2  | b1 | b0 |
| R   | R   | R   | R   | R   | R   | R  | R. |

24. An apparatus as claimed in claim 23 wherein said non-zero 16-bin codeword has the following format:

| b7 | b6 | b5 | b4 | b3 | b2 | b1 | b0 |
|----|----|----|----|----|----|----|----|
| 1  | B  | B  | B  | B  | R  | R  | R. |

25. An apparatus as claimed in claim 24 wherein said non-zero 64-bin codeword has the following format:

| b7 | b6 | b5 | b4 | b3 | b2 | b1 | b0 |
|----|----|----|----|----|----|----|----|
| 1  | B  | B  | B  | B  | B  | B  | R. |

26. An apparatus as claimed in claim 25 wherein said encoder includes a plurality of huffman coders wherein said plurality of grouped subbands are fed into the huffman coders thereby producing a plurality of huffman compressed subbands and said huffman compressed subbands are fed into said plurality of Lempel-Ziv coders and wherein, said decoder includes a plurality of huffman coders whereby said plurality of decompressed signals are fed into the huffman coders thereby producing a plurality of huffman decompressed subbands and said Huffman decompressed subbands are fed into said plurality of run length decoders.

27. A method of coding and decoding video signals, comprising the steps of;
coding a video signal by,
providing said video signal,
processing said video signal through a subbanding means thereby producing a plurality of subbands,
processing said plurality of subbands through a plurality of quantizers thereby mapping said plurality of subbands into a bin and producing a plurality of quantized subbands,
processing said plurality of quantized subbands through a plurality of run length coders thereby grouping said plurality of quantized subbands and producing a plurality of grouped subbands,
processing said plurality of grouped subbands through a Lempel-Ziv coder whereby said grouped subbands are compressed thereby producing a plurality of compressed subbands,
combining said compressed subbands by using a data commutator/transmitter thereby producing a coded video signal and,
decoding said coded video signal by,
processing said coded video signal through a data receiver/decommutator thereby producing a plurality of compressed subbands,
decompressing said plurality of compressed subbands using a plurality of Lempel-Ziv decoder thereby producing decompressed subbands,
ungrouping said plurality of decompressed subbands using a plurality of run length coders thereby producing a plurality of ungrouped subbands,
processing said plurality of ungrouped subbands through a plurality of range shifter thereby producing a plurality of subbands,
processing said plurality of subbands through an inverse subband means thereby producing a decoded video signal.

28. A method as claimed in claim 27 wherein said plurality of grouped signals are compressed by a plurality of Huffman coders before compression by said Lempel-Ziv coder and said plurality of decompressed signals are decompressed in a plurality of Huffman coders before ungrouping said signals in said plurality of run length coders.

* * * * *